United States Patent
Inden et al.

(10) Patent No.: US 12,129,777 B2
(45) Date of Patent: Oct. 29, 2024

(54) OIL SUPPLY

(71) Applicant: DEUTZ Aktiengesellschaft, Cologne (DE)

(72) Inventors: Alfred Inden, Pulheim (DE); Daniel Bertram, Bergheim (DE)

(73) Assignee: DEUTZ AKTIENGESELLSCHAFT, Cologne (DE)

( * ) Notice: Subject to any disclaimer, the term of this patent is extended or adjusted under 35 U.S.C. 154(b) by 0 days.

(21) Appl. No.: 17/420,310

(22) PCT Filed: Jan. 8, 2020

(86) PCT No.: PCT/EP2020/000003
§ 371 (c)(1),
(2) Date: Jul. 1, 2021

(87) PCT Pub. No.: WO2020/151902
PCT Pub. Date: Jul. 30, 2020

(65) Prior Publication Data
US 2022/0090524 A1    Mar. 24, 2022

(30) Foreign Application Priority Data
Jan. 23, 2019    (DE) .................... 10 2019 000 489.2

(51) Int. Cl.
*F01M 9/10*    (2006.01)
*F01M 11/02*    (2006.01)

(52) U.S. Cl.
CPC ............ *F01M 9/102* (2013.01); *F01M 9/107* (2013.01); *F01M 11/02* (2013.01)

(58) Field of Classification Search
CPC ........ F01M 9/102; F01M 9/107; F01M 11/02; F01M 9/10; F01L 1/181; F01L 1/18;
(Continued)

(56) References Cited

U.S. PATENT DOCUMENTS 1,969,690 A * 8/1934 Church ................. F02F 7/0007
184/6.5
4,858,574 A * 8/1989 Fukuo ..................... F01M 1/16
123/90.34
(Continued)

FOREIGN PATENT DOCUMENTS

| CN | 201531290 U | 7/2010 |
| DE | 4024057 C1 | 9/1991 |

(Continued)

OTHER PUBLICATIONS

International Search Report for PCT/EP2020/000003, dated Feb. 28, 2020.

*Primary Examiner* — Kenneth J Hansen
*Assistant Examiner* — Kelsey L Stanek
(74) *Attorney, Agent, or Firm* — Davidson Kappel LLC

(57) ABSTRACT

An internal combustion engine includes at least one cylinder crankcase, at least one cylinder head (1), at least one overhead camshaft (2), at least two rocker arms (3) which are driven by the camshaft (2) and actuate the combustion valves, the camshaft(s) (2) being mounted in the cylinder head housing, and an oil supply line (9) which is situated in particular in the area of the top face of the cylinder head (1) for lubricating camshaft bearing brackets (10) and the rocker arm brackets (11).

7 Claims, 4 Drawing Sheets

Section A-A

Cylinder head-valve cover frame interface

(58) Field of Classification Search
CPC ............... F01L 1/053; F01L 2001/0476; F01L 2001/0535; F01L 2810/02
USPC .......................................... 123/90.44, 196 R
See application file for complete search history.

(56) References Cited

U.S. PATENT DOCUMENTS

| | | | |
|---|---|---|---|
| 4,928,641 | A | 5/1990 | Niizato et al. |
| 5,138,985 | A | 8/1992 | Szodfridt et al. |
| 2018/0274407 | A1 * | 9/2018 | Kashiwabara ...... F01L 13/0036 |

FOREIGN PATENT DOCUMENTS

| | | | | |
|---|---|---|---|---|
| DE | 3874112 | T2 | 12/1992 | |
| DE | 4214800 | A1 | 11/1993 | |
| DE | 69024117 | T2 | 5/1996 | |
| DE | 19845942 | A1 * | 4/2000 | ............... F01L 1/053 |
| EP | 0212981 | A2 | 3/1987 | |
| EP | 0213787 | A1 | 3/1987 | |
| EP | 0408081 | A1 * | 1/1991 | |
| EP | 744531 | A1 * | 11/1996 | ............... F01L 1/053 |
| EP | 0654589 | B1 | 12/1997 | |
| GB | 2141780 | A | 1/1985 | |
| JP | H04232320 | A | 8/1992 | |
| JP | 2008038846 | A | 2/2008 | |
| JP | 2013076404 | A | 4/2013 | |

* cited by examiner

Section A-A

OIL SUPPLY

The present disclosure relates to an internal combustion engine including an oil supply of a cam drive and to a method.

BACKGROUND

Such internal combustion engines are known from DE 4214800 A1, where an oil supply of a cam drive is shown, in particular, in FIG. 1. The disadvantage of this is that the friction point between the cam and the follower is not reliably supplied with oil.

Furthermore, such an oil supply of a cam drive inside the cylinder head is implemented with many large oil supply boreholes.

Here, the great complexity of closing these oil supply boreholes again to the outside is disadvantageous.

SUMMARY

It is an object of the present disclosure to create an internal combustion engine including an oil supply of a cam drive, which is easy to produce and which reliably supplies the friction points with lubricant.

An internal combustion engine is provided, including at least one cylinder crankcase, at least one cylinder head, at least one overhead camshaft, at least two rocker arms which are driven by the camshaft and actuate the combustion valves, the camshaft(s) being mounted in the cylinder head housing, and an oil supply, which, in particular, is situated in the area of the top face of the cylinder head for lubricating camshaft bearing brackets and the rocker arm brackets.

The advantage in the process is that the friction points are reliably supplied with lubricant, and the manufacturing costs of the cylinder head are reduced.

Another advantageous embodiment provides that the shaft section is situated above a constriction of the flat follower.

Further important features and advantages are derived from the subclaims, from the drawing, and from the following description of one preferred exemplary embodiment based on the drawing.

DETAILED DESCRIPTION

Figure 1:
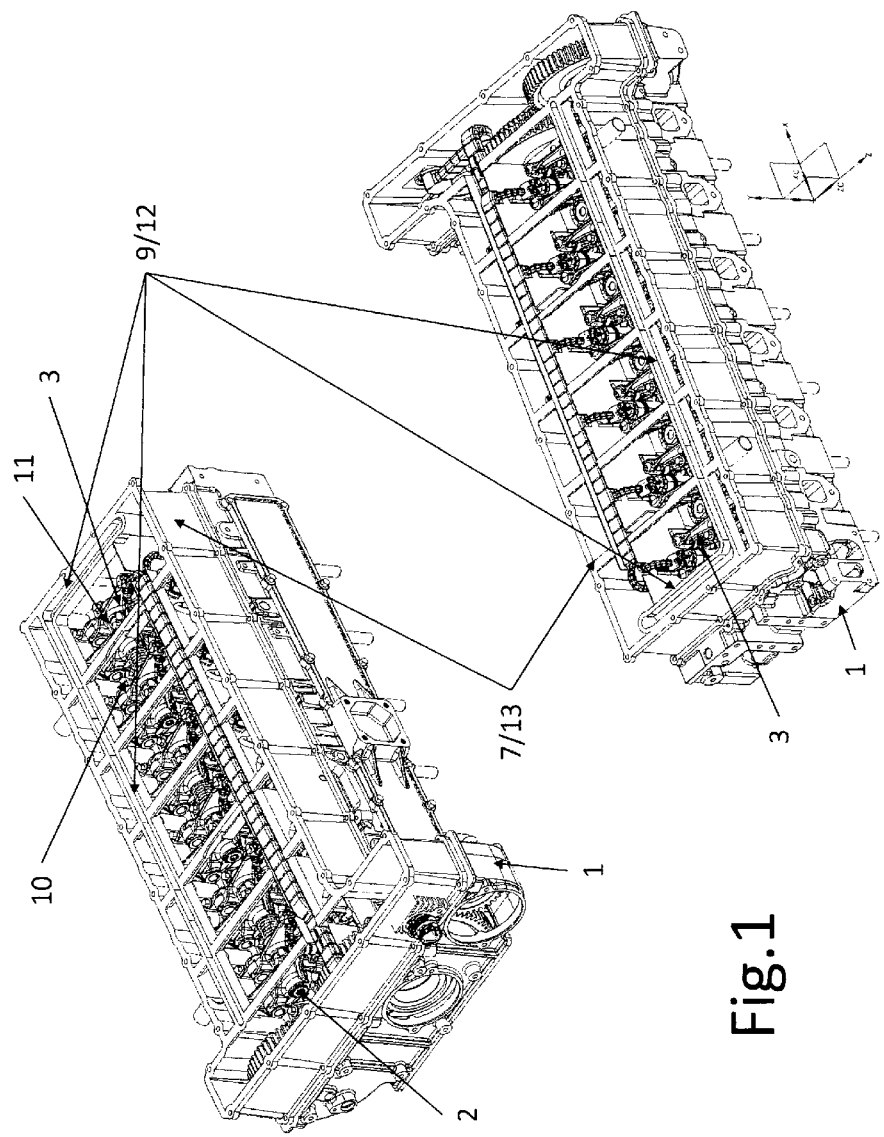
FIG. 1 shows a cylinder head of the internal combustion engine.

FIG. 1 shows a cylinder head of internal combustion engine 1 in two different views, in which a clockwise rotating camshaft 2 is mounted. The engine oil is conducted from the crankcase of the internal combustion engine with the aid of an oil supply borehole 4 through cylinder head 1 to valve cover frame 7. The top face of cylinder head 1 forms sealing surface 6 to valve cover frame 7. At this separation plane 8, the oil is transferred into valve cover frame 7. In valve cover frame 7, the engine oil is further conducted via an oil supply line 9 to the required locations, such as e.g., camshaft bearing brackets 10 and rocker arm brackets 11. This oil supply line 9 is introduced as an independent and/or as an integrated part 12 into frame 13. High oil pressures arise during the cold start. The pressure resistance of valve cover frame 7 has to be designed accordingly. The pressure resistance of oil supply line 9 also has to be designed accordingly. Furthermore, it is provided to apply a reduced oil pressure to valve cover frame 7 and/or oil supply line 9 with the aid of oil pressure valve 14, in particular during the cold start phase. Another measure is to provide a defined oil leakage to apply a reduced oil pressure to valve cover frame 7 and/or oil supply line 9 with the aid of an oil pressure valve 14, in particular during the cold start phase.

Figure 2:
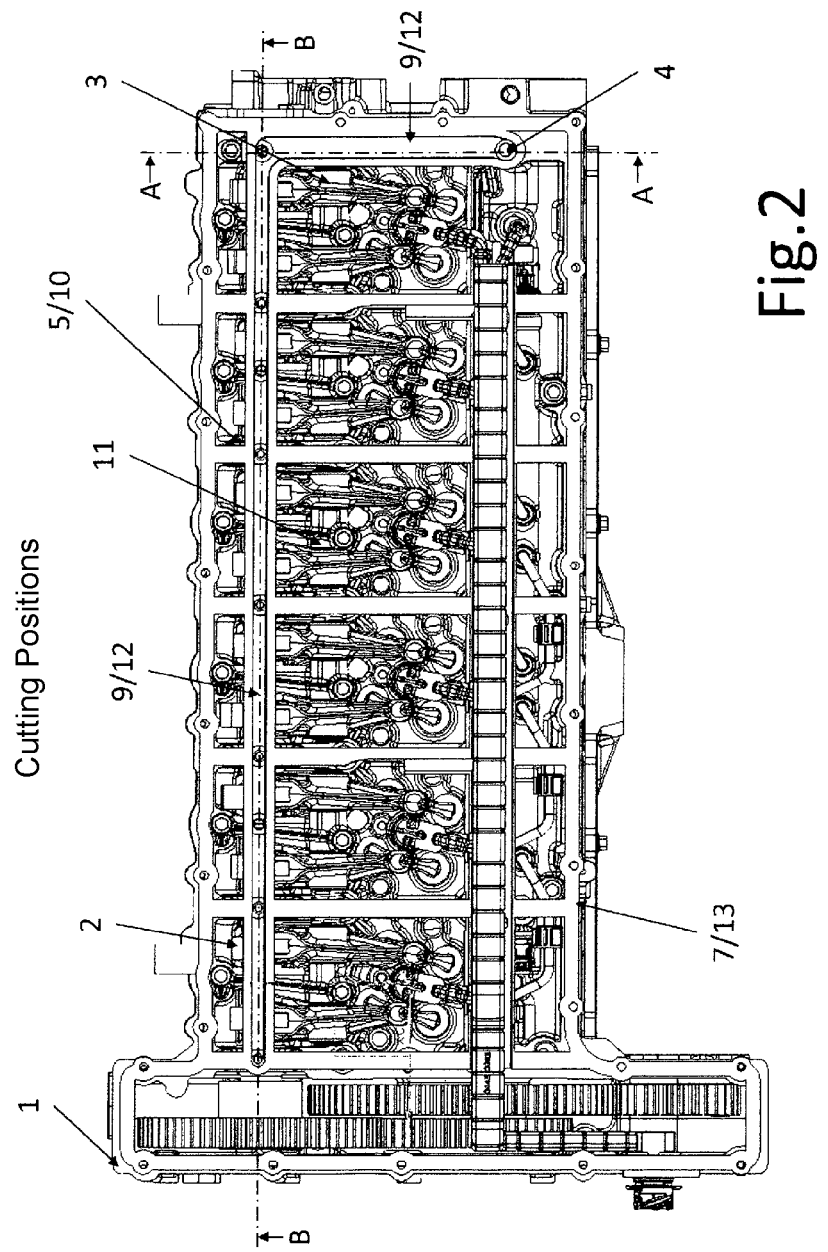
FIG. 2 shows the cylinder head of the internal combustion engine from FIG. 1 in a top view.

FIG. 2 shows the cylinder head of internal combustion engine 1 from FIG. 1 in a top view in which a clockwise rotating camshaft 2 is mounted. The engine oil is conducted from the crankcase of the internal combustion engine with the aid of an oil supply borehole 4 through cylinder head 1 to valve cover frame 7. The top face of cylinder head 1 forms sealing surface 6 to valve cover frame 7. At this separation plane 8, the oil is transferred into valve cover frame 7. In valve cover frame 7, the engine oil is further conducted via an oil supply line 9 to the required locations, such as e.g., camshaft bearing brackets 10 and rocker arm brackets 11. This oil supply line 9 is introduced as an independent and/or as an integrated part 12 into frame 13. High oil pressures arise during the cold start. The pressure resistance of valve cover frame 7 has to be designed accordingly. The pressure resistance of oil supply line 9 also has to be designed accordingly. Furthermore, it is provided to apply a reduced oil pressure to valve cover frame 7 and/or oil supply line 9 with the aid of oil pressure valve 14, in particular during the cold start phase. Another measure is to provide a defined oil leakage to apply a reduced oil pressure to valve cover frame 7 and/or oil supply line 9 with the aid of an oil pressure valve 14, in particular during the cold start phase.

Figure 3:
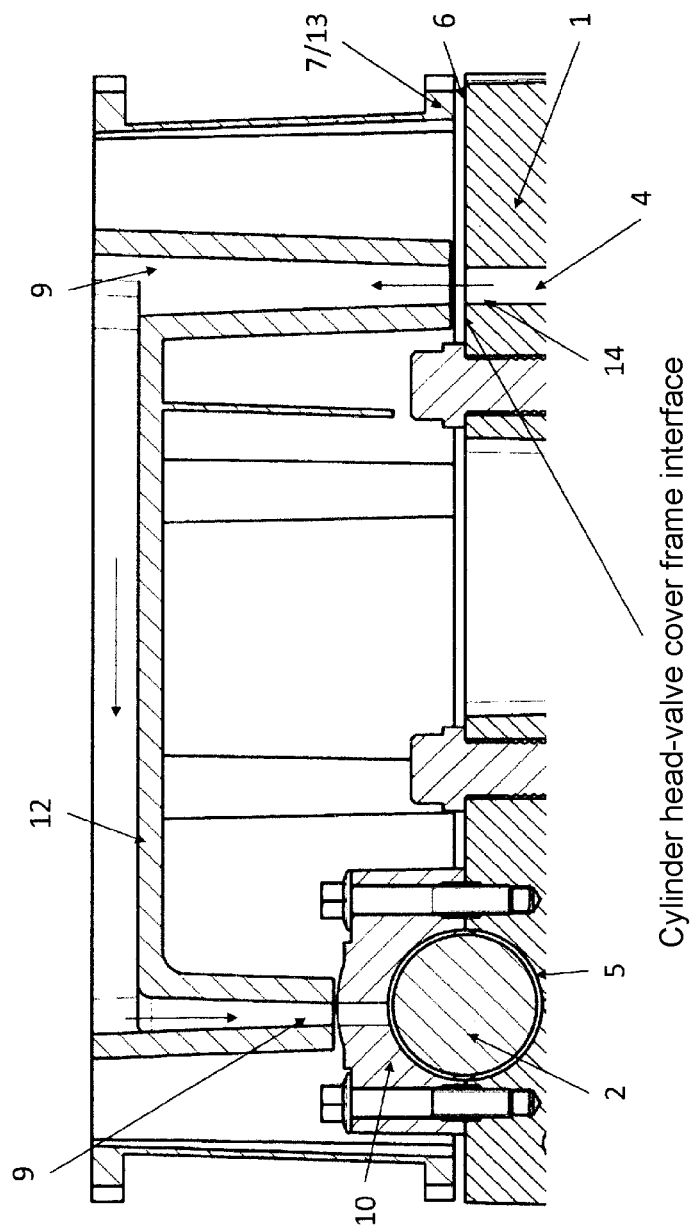
FIG. 3 shows a section A-A from FIG. 2 of the cylinder head of the internal combustion engine.

FIG. 3 shows section A-A from FIG. 2 of the cylinder head of internal combustion engine 1 in which a clockwise rotating camshaft 2 is mounted. The engine oil is conducted from the crankcase of the internal combustion engine with the aid of an oil supply borehole 4 through the cylinder head 1 to valve cover frame 7. The top face of cylinder head 1 forms sealing surface 6 to valve cover frame 7. At this in separation plane 8, the oil is transferred into valve cover frame 7. In valve cover frame 7, the engine oil is further conducted via an oil supply line 9 to the required locations, such as e.g., camshaft bearing brackets 10 and rocker arm brackets 11. This oil supply line 9 is introduced as an independent and/or as an integrated part 12 into frame 13. High oil pressures arise during the cold start. The pressure resistance of valve cover frame 7 has to be designed accordingly. The pressure resistance of oil supply line 9 also has to be designed accordingly. Furthermore, it is provided to apply a reduced oil pressure to valve cover frame 7 and/or oil supply line 9 with the aid of an oil pressure valve 14, in particular during the cold start phase. Another measure is to provide a defined oil leakage to apply a reduced oil pressure to valve cover frame 7 and/or oil supply line 9 with the aid of an oil pressure valve 14, in particular during the cold start phase.

Figure 4:
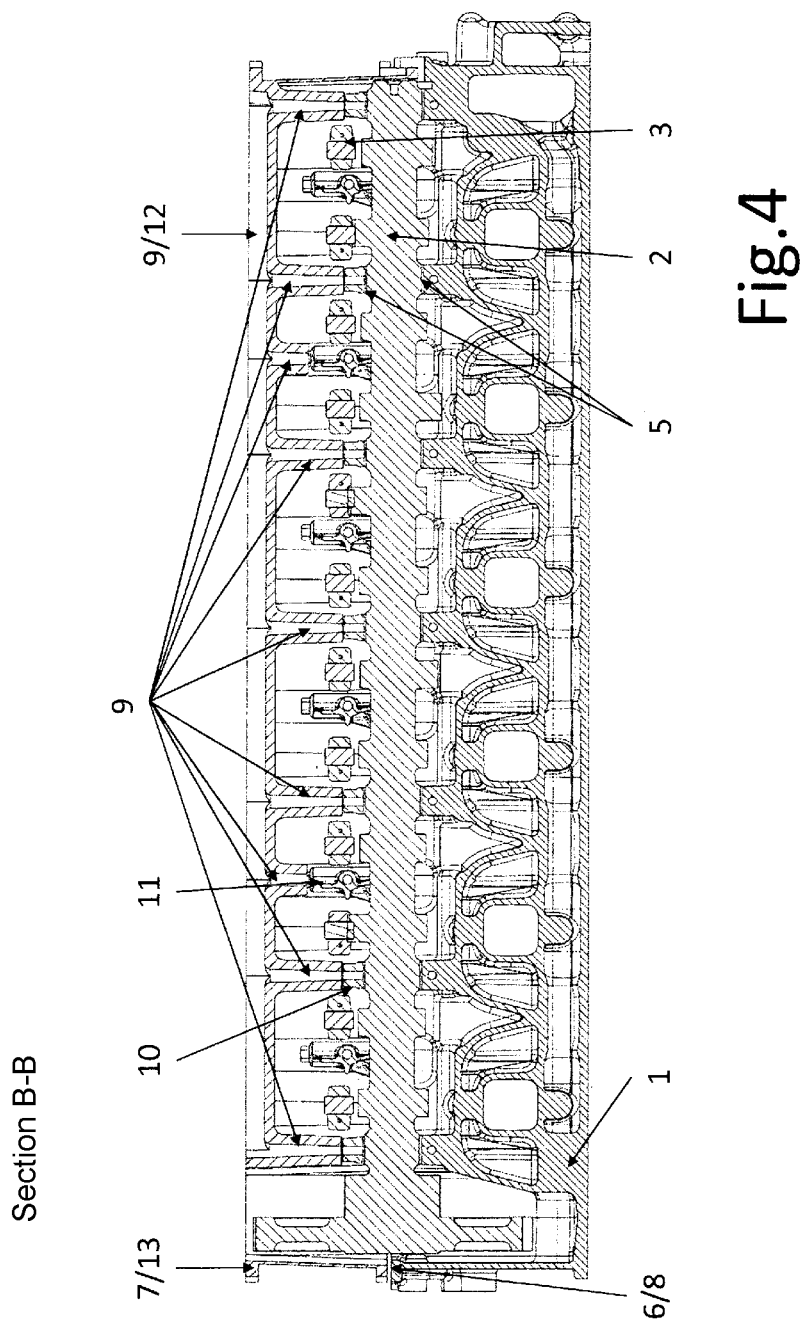
FIG. 4 shows a section B-B from FIG. 2 of the cylinder head of the internal combustion engine.

FIG. 4 shows section B-B from FIG. 2 of the cylinder head of internal combustion engine 1 in which a clockwise rotating camshaft 2 is mounted. The engine oil is conducted from the crankcase of the internal combustion engine with the aid of an oil supply borehole 4 through cylinder head 1 to valve cover frame 7. The top face of cylinder head 1 forms sealing surface 6 to valve cover frame 7. At this separation plane 8, the oil is transferred into valve cover frame 7. In valve cover frame 7, the engine oil is further conducted via an oil supply line 9 to the required locations, such as e.g., camshaft bearing brackets and rocker arm brackets 11. This oil supply line 9 is introduced as an independent and/or as an integrated part 12 into frame 13. High oil pressures arise during the cold start. The pressure resistance of valve cover frame 7 has to be designed accordingly. The pressure resistance of oil supply line 9 also has to be designed accordingly. Furthermore, it is provided to apply a reduced oil pressure to valve cover frame 7 and/or oil supply line 9 with the aid of an oil pressure valve 14, in particular during the cold start phase. Another measure is to provide a defined oil leakage to apply a reduced oil pressure to valve cover frame 7 and/or oil supply line 9 with the aid of an oil pressure valve 14, in particular during the cold start phase.

LIST OF REFERENCE NUMERALS

1 Cylinder head of internal combustion engine
2 Camshaft
3 Rocker arm
4 Oil supply borehole
5 Camshaft bearing in cylinder crankcase of internal combustion engine
6 Sealing surface
7 Valve cover frame
8 Separation plane
9 Oil supply line
10 Camshaft bearing brackets
11 Rocker arm brackets
12 Integrated part
13 Frame
14 Oil pressure valve

What is claimed is:

1. An internal combustion engine comprising:
a cylinder crankcase;
a cylinder head;
an overhead camshaft;
at least two rocker arms driven by the overhead camshaft and to actuate combustion valves, the overhead camshaft being mounted in a cylinder head housing;
a valve cover frame arranged at a top face of perimeter walls of the cylinder head, the top face of the cylinder head forming a sealing surface to the valve cover frame;
an oil supply borehole configured for conducting engine oil from the cylinder crankcase through the cylinder head to the valve cover frame;
an oil supply line situated in an area of the top face of the cylinder head for lubricating camshaft bearing brackets and rocker arm brackets, wherein said oil supply line is arranged in the valve cover frame; and
an oil pressure-limiting oil pressure valve situated upstream from the oil supply borehole or at a transfer point of the cylinder head to the valve cover frame.

2. The internal combustion engine as recited in claim 1, further comprising an oil pressure-limiting oil leakage situated at a transfer point of the cylinder head to the valve cover frame.

3. The internal combustion engine as recited in claim 1, wherein a bottom face of all perimeter walls of the valve cover frame rest on the top face of the perimeter walls of the cylinder head.

4. The internal combustion engine as recited in claim 1, wherein the oil supply line is integrated into the valve cover frame.

5. A method for operating the internal combustion engine as recited in claim 1 comprising:
lubricating the camshaft bearing brackets and/or the rocker arm brackets via the oil supply line.

6. An internal combustion engine comprising:
a cylinder crankcase;
a cylinder head;
an overhead camshaft;
at least two rocker arms driven by the overhead camshaft and to actuate combustion valves, the overhead camshaft being mounted in a cylinder head housing;
a valve cover frame enclosing said rocker arms and arranged at a top face of the cylinder head, the top face of the cylinder head forming a sealing surface to the valve cover frame;
an oil supply borehole configured for conducting engine oil from the cylinder crankcase through the cylinder head to the valve cover frame;
an oil supply line situated in an area of the top face of the cylinder head for lubricating camshaft bearing brackets and rocker arm brackets, wherein said oil supply line is arranged in the valve cover frame; and
an oil pressure-limiting oil pressure valve situated upstream from the oil supply borehole or at a transfer point of the cylinder head to the valve cover frame.

7. An internal combustion engine comprising:
a cylinder crankcase;
a cylinder head;
an overhead camshaft;
at least two rocker arms driven by the overhead camshaft and to actuate combustion valves, the overhead camshaft being mounted in a cylinder head housing;
a valve cover frame arranged at a top face of perimeter walls of the cylinder head, the top face of the cylinder head forming a sealing surface to the valve cover frame;
an oil supply borehole configured for conducting engine oil from the cylinder crankcase through the cylinder head to the valve cover frame;
an oil supply line situated in an area of the top face of the cylinder head for lubricating camshaft bearing brackets and rocker arm brackets, wherein said oil supply line is arranged in the valve cover frame; and
an oil pressure-limiting oil leakage situated at a transfer point of the cylinder head to the valve cover frame.

* * * * *